UNITED STATES PATENT OFFICE.

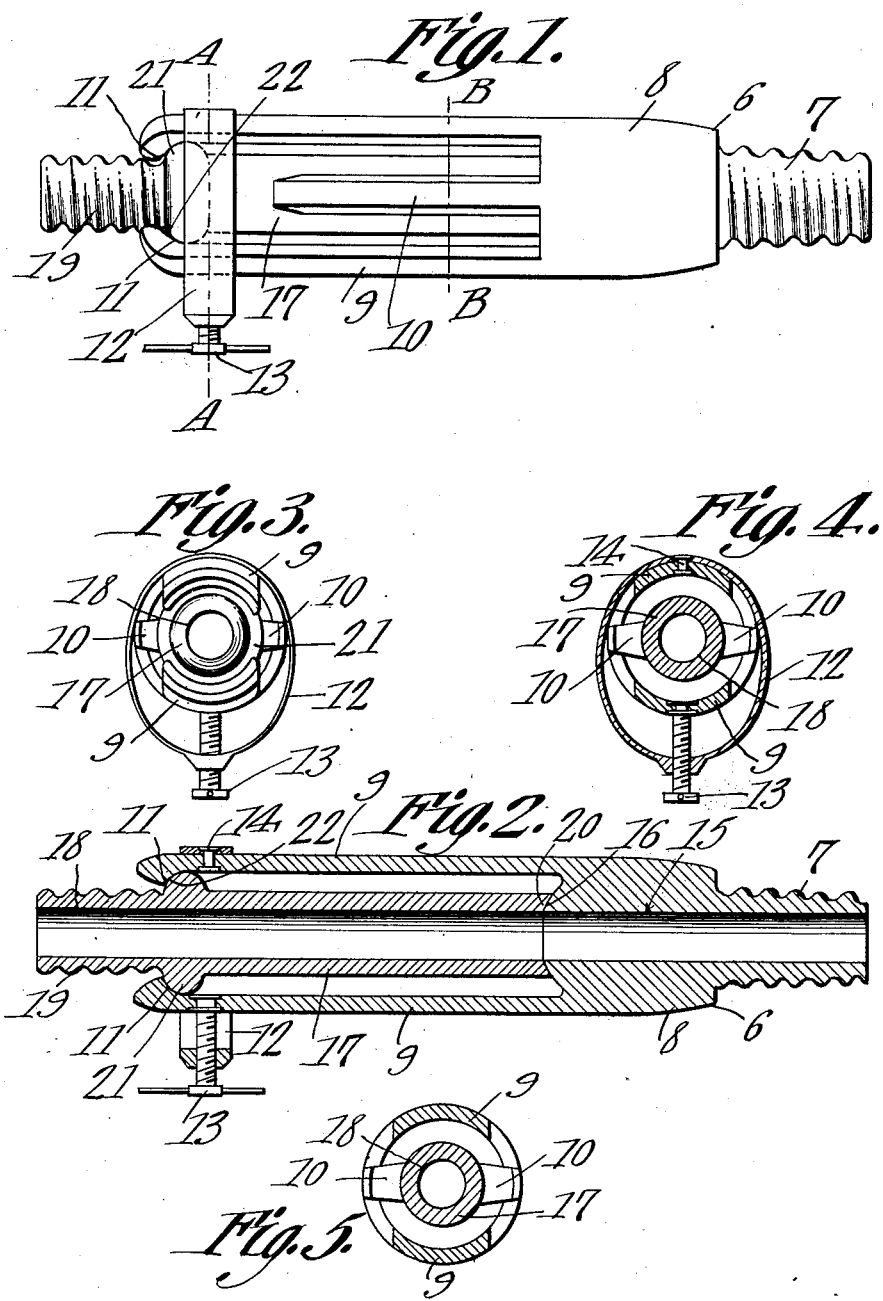

EDGAR F. GIROD, OF MONROE, LOUISIANA, ASSIGNOR OF ONE-HALF TO WALTER SCOTT LEYENS, OF MONROE, LOUISIANA.

PIPE-COUPLING.

1,097,798. Specification of Letters Patent. Patented May 26, 1914.

Application filed April 17, 1913. Serial No. 761,779.

*To all whom it may concern:*

Be it known that I, EDGAR F. GIROD, a citizen of the United States, residing at Monroe, in the parish of Ouachita and State of Louisiana, have invented a new and useful Pipe-Coupling, of which the following is a specification.

This invention relates to improvements in pipe couplings and more particularly to a coupling for hose pipes whereby a quick and efficient joint may be made between the ends of hose pipes.

An object of the present invention is to provide a hose coupling with the two meeting ends thereof provided with a ground joint and means whereby the ends may be forcibly held together in order to thereby obtain a seal joint therebetween.

A further object is to provide the meeting ends of hose pipes with members adapted to fit one into the other, with means upon one adapted to engage a wedge-shaped surface upon the other and to provide a thumb screw adapted to engage one of the said wedged surfaces to hold the two said members in forced contact to thereby hold the contacting surfaces together to thereby effect a sealed juncture therebetween.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in elevation of my improved hose pipe coupling. Fig. 2 is a vertical cross sectional view taken about the longitudinal axis thereof. Fig. 3 is a front view thereof. Fig. 4 is a cross sectional view taken on the line A—A of Fig. 1. Fig. 5 is a cross sectional view taken on the line B—B of Fig. 1.

Referring to the drawings in which similar reference numerals designate corresponding parts throughout the several views, 6 is one of the coupling members and is provided with a corrugated end 7 to which a hose pipe may be secured. The coupling member 6 is provided with the body portion 8 extending from which are the gripping jaws 9 and the guide arms 10.

The outer extremities of the gripping jaws 9 which are arranged diametrically opposite are bent downward and provided with the wedge-shaped ends 11, the same being adapted to engage a wedge-shaped surface formed on the other coupling member and to force the same into contact with the first mentioned coupling member to thereby effect a liquid-tight joint between the two. In order that the gripping jaws 9 may be forcibly pressed together, the ring 12 is rigidly secured to one of the gripping jaws and is provided with the thumb screw 13 pivoted to and positively engaging the other of the said jaws, the same being more clearly illustrated in Fig. 2 of the drawings. The thumb screw 13 threadedly engages the band-like ring 12 and is therefore adapted to force the two jaws together or to increase the distance therebetween. The said ring 12 is rivetedly secured as at 14, to one of the gripping jaws adjacent the front end thereof and diametrically opposite therefrom is the thumb screw 13. The body portion 8 of the coupling member 6 is provided with the bore 15 extending therethrough and which bore terminates in the ground seat 16.

A second coupling member 17 is provided with the bore 18 extending therethrough and one end of the said coupling member is corrugated as at 19 to frictionally engage a hose pipe. The remote end 20 therefrom is ground to form a seat and seal joint with the portion 16 of the coupling member 6. The second coupling member 17 is provided with the annular flange 21 formed integral therewith and said flange is provided with the beveled face 22, the same coöperating with the beveled ends 11 of the gripping jaws to thereby present a surface which may be wedgedly engaged to force the two members together, with the result that a tight joint will be effected between the portions 16 and 20 of the two coupling members.

In order that the coupling member 17 may be quickly inserted in place within the coupling member 6, the guide arms 10 are provided which are adapted to contact with the coupling member 17 and to guide the same so as to bring the portions 20 and 16 in proper relation. The bores 15 and 18 of the two coupling members are of substantially the same diameter and therefore a continuous opening will be provided through the coupling member for the unrestricted flow of a liquid therethrough.

The hose coupling as I have described it is particularly adapted for those instances wherein a quick and effective joint is required between the meeting ends of two hose pipes, an example being, the coupling of the various lengths of fire hose and it will be readily appreciated that the joint or coupling hereinbefore described will be particularly adapted for such purposes. The coupling member 17 is quickly positioned between the gripping jaws 9 of the other coupling member and by a longitudinal movement is slid between the guide arms 10 and into proper position with relation to the other coupling member whereby the two ground surfaces 20 and 16 will be brought into contact. By rotating the thumb screw 13, the jaws 9 will come into forced contact with the beveled flange 21, and the beveled surfaces of the gripping jaw ends 11 coöperating with the wedge-shaped flange will bring a certain pressure to bear upon the ground surfaces 20 and 16 to thereby force the same into a sealed or liquid-tight condition.

When it is desired to uncouple the various hose lengths, it is merely necessary to unscrew the thumb screw 13 until the flange 21 may pass beyond the beveled ends 11 of the gripping jaws after which the two members may be quickly moved apart and the hose ends therefore uncoupled.

The entire construction will be made of metal or suitable material throughout and the gripping jaws provided with sufficient inherent resiliency to allow the same to be sprung together or spread apart as the case may be.

Having thus fully described the invention what I claim to be new and original with me is:—

A pipe union comprising a coupling member including a body portion, arms extending therefrom and provided at their extremities with inwardly projecting ends, guide arms carried by the said coupling member of relatively less length and spaced a relatively smaller distance apart than the aforementioned arms, a second coupling member including a cylindrical body portion with a beveled annular flange carried thereby, the said cylindrical body in surface contact with the inner surface of said guide arms and guided in its longitudinal movements and assisted in rectilinear motion thereby, a ring embracing the first mentioned arms adjacent their outer extremities and rigidly secured to one of the same, a thumb screw extending through the ring and rotatably engaging the opposite arm adapted to bring the bent ends of the arms into forcible contact with the beveled flange of the second mentioned coupling member and to forcibly move the two coupling members together and lock the same in such relation, the meeting faces of the coupling members lying in a plane substantially perpendicular to the longitudinal axis of the coupling members, the said thumb screw adapted to retain the arms at any required distance apart.

In testimony that I claim the foregoing as my own, I have hereto affixed my signature in the presence of two witnesses.

EDGAR F. GIROD.

Witnesses:
W. L. KAY,
WM. JOHNSON.

Copies of this patent may be obtained for five cents each, by addressing the "Commissioner of Patents, Washington, D. C."